T. B. WYLIE.
REGULATING APPARATUS.
APPLICATION FILED APR. 23, 1914.
1,174,789.
Patented Mar. 7, 1916.
3 SHEETS—SHEET 2.
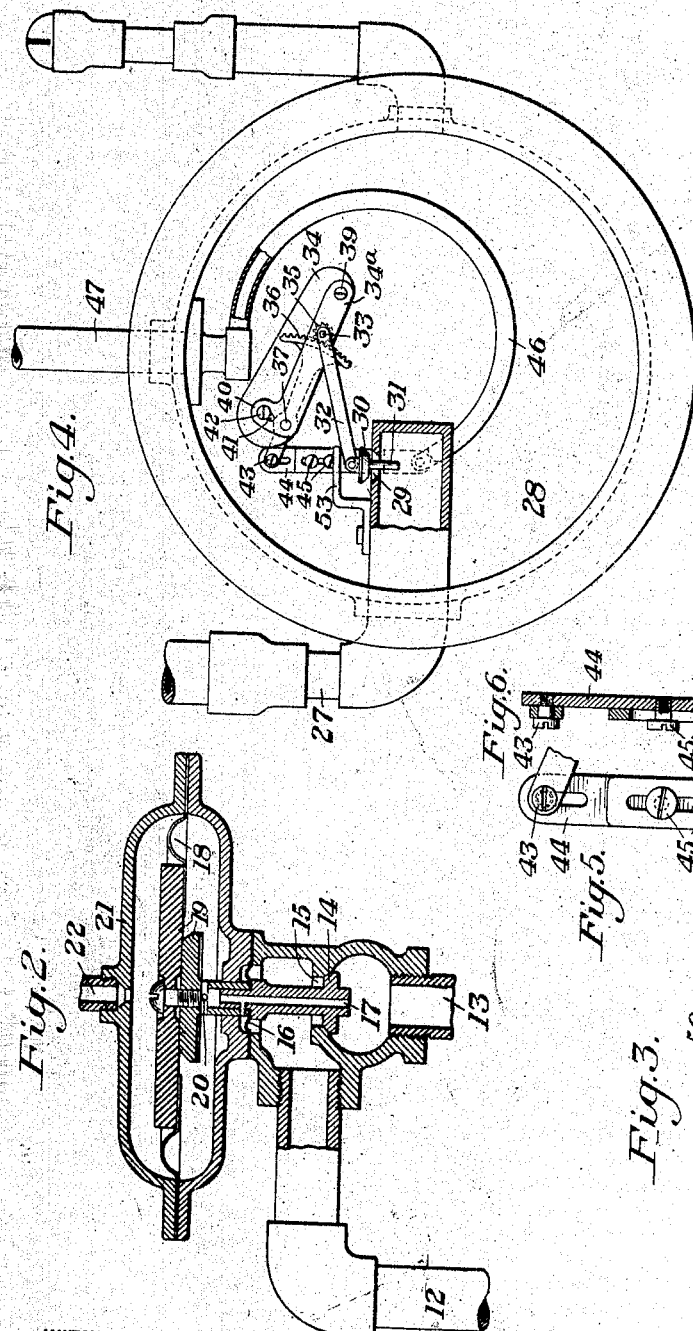
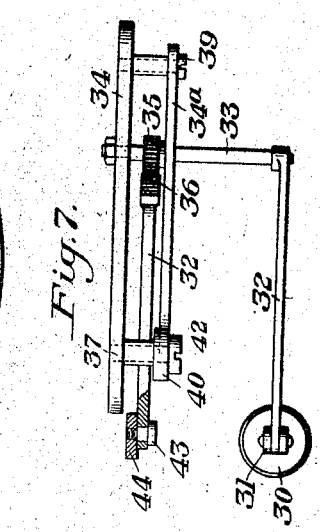
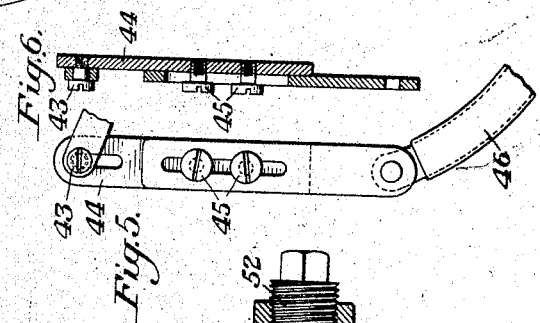
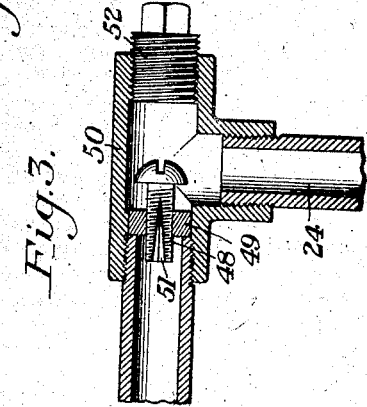
WITNESSES
INVENTOR

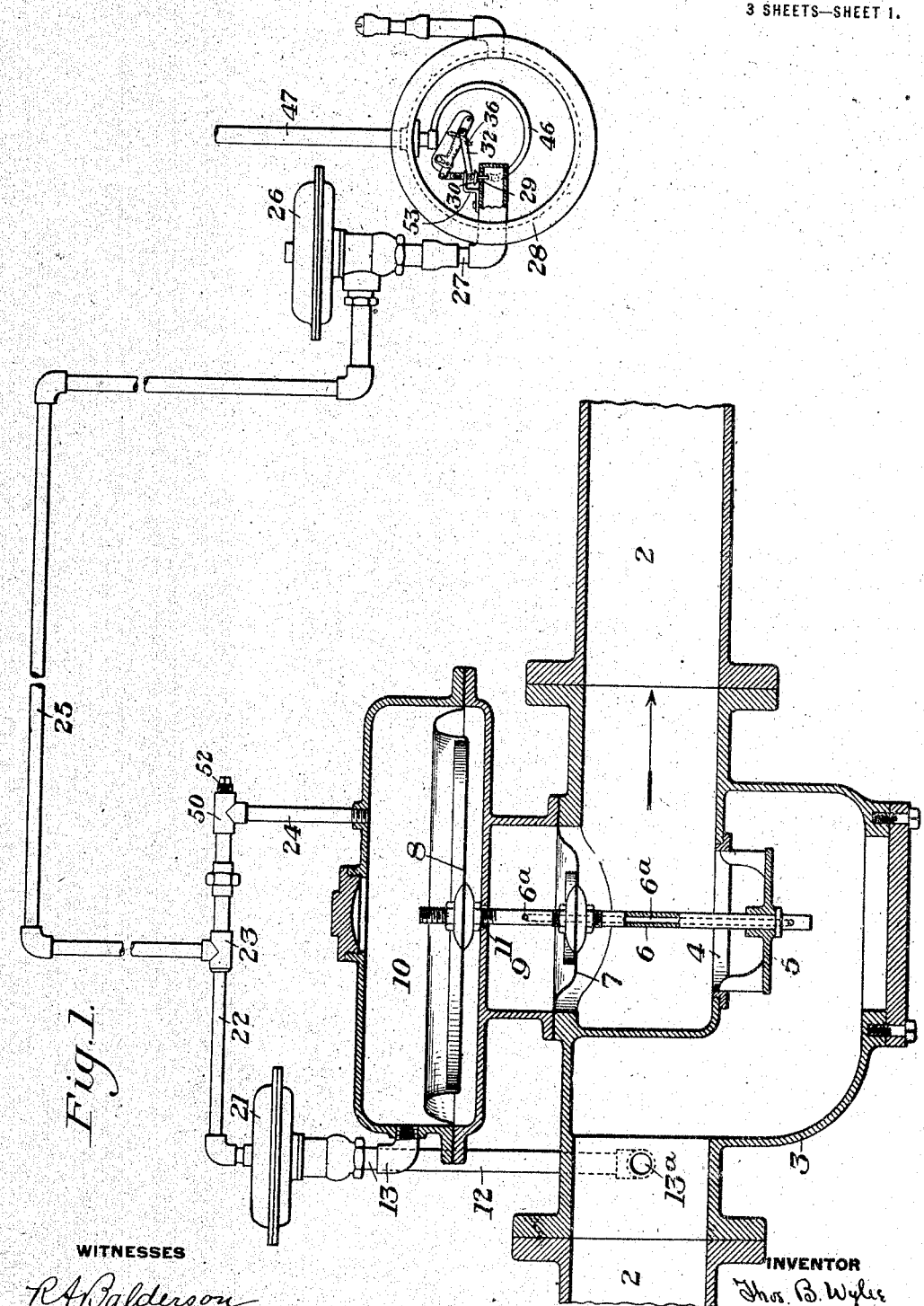

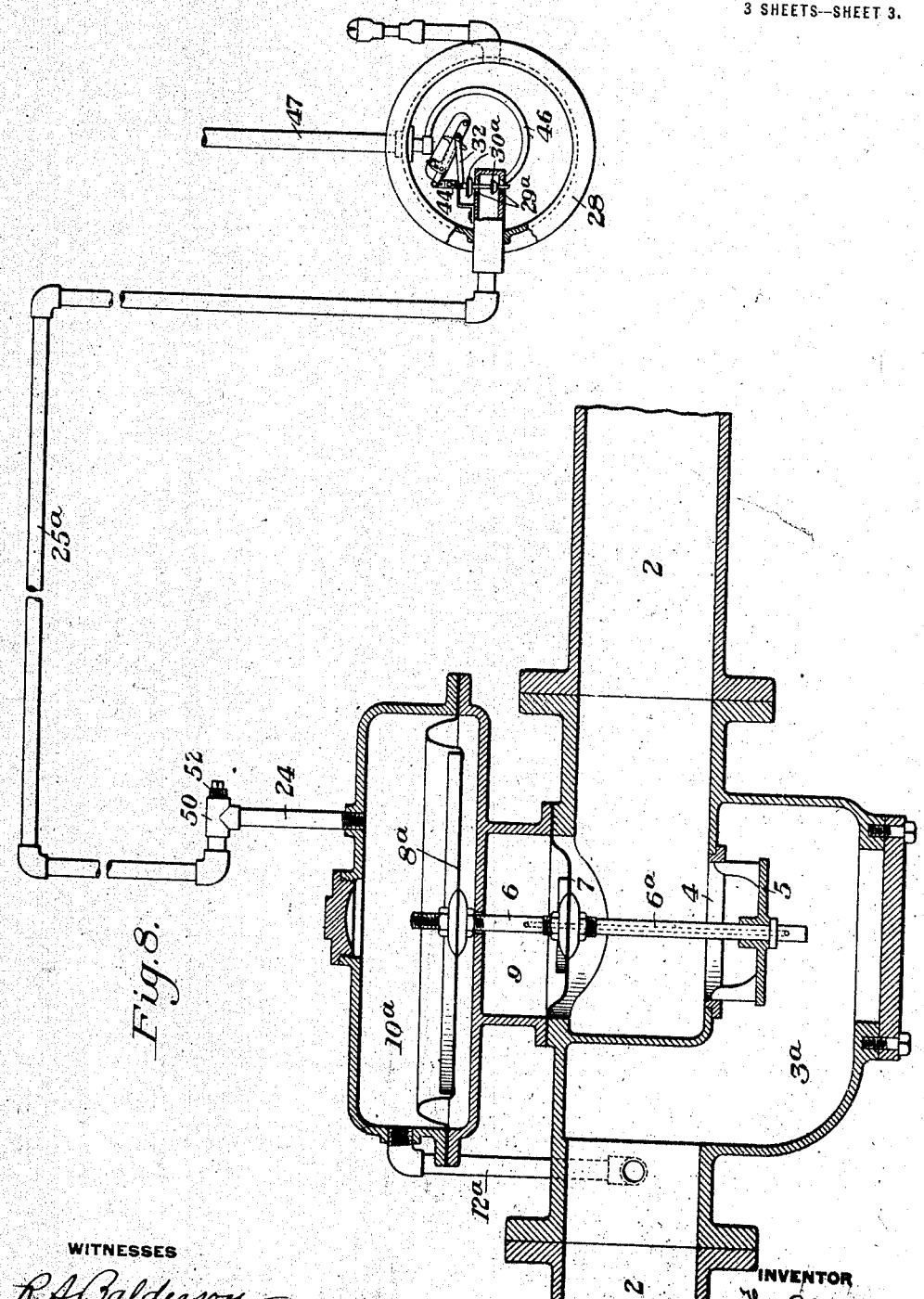

UNITED STATES PATENT OFFICE.

THOMAS B. WYLIE, OF PITTSBURGH, PENNSYLVANIA, ASSIGNOR TO EQUITABLE METER COMPANY, OF PITTSBURGH, PENNSYLVANIA, A CORPORATION OF PENNSYLVANIA.

REGULATING APPARATUS.

1,174,789.  Specification of Letters Patent.  Patented Mar. 7, 1916.

Application filed April 23, 1914. Serial No. 833,938.

*To all whom it may concern:*

Be it known that I, THOMAS B. WYLIE, a citizen of the United States, residing at Pittsburgh, in the county of Allegheny and State of Pennsylvania, have invented a new and useful Improvement in Regulating Apparatus, of which the following is a full, clear, and exact description, reference being had to the accompanying drawings, forming part of this specification, in which—

Figure 1 is a view partly in vertical section and partly in elevation and largely conventional of one form of regulating device embodying my invention; Fig. 2 is a detail sectional view showing the small diaphragm-controlled valves; Fig. 3 is a detail sectional view of a throttling valve; Figs. 4, 5, 6 and 7 are detail views showing parts of the apparatus hereinafter more fully described; Fig. 8 is a view similar to Fig. 1, but showing a modification.

My invention has relation to regulating apparatus and while it is adaptable to a variety of different purposes, it has been more particularly designed for use as a boiler regulator for gas-fired boilers.

My invention provides means of extremely sensitive, reliable and accurate character for automatically controlling the supply of gas to the boiler furnace, in accordance with the steam pressure developed by the boiler.

The nature of my invention will be best understood by reference to the accompanying drawings in which I have shown two different embodiments thereof and which will now be described, it being premised, however, that various changes may be made in the details of construction and arrangement of the various parts, without departing from the spirit and scope of my invention as defined in the appended claims.

Referring first to that form of my invention shown in Figs. 1 to 7, inclusive, the numeral 2 designates a pipe line through which flows the volume of fluid to be controlled, in this particular instance, the gas which supplies the burners of the boiler furnace. 3 is a valve casing which is interposed in this pipe line and has the regulating port 4, controlled by the regulating valve 5. The valve 5 is carried by a stem 6, which is attached to the central portions of the two diaphragms or pressure plates 7 and 8. The upper side of the diaphragm 7 has substantially the same effective pressures as the lower side of the valve 5, and to attain this equal pressure, the stem 6 has a port 6ª therethrough which communicates at its lower end with a space below the valve and at its upper end with the chamber 9 above the diaphragm 7. The diaphragm 8 is mounted within another chamber 10 above the chamber 9, and the space below the diaphragm in this chamber communicates with the chamber 9 by means of the opening 11. It will be apparent, therefore, that the valve 5 is normally substantially balanced by the pressure thereon and at opposite sides of the diaphragm 7. The portion of the chamber 10 above the diaphragm 8 is connected by the pipes 12 and 13 with the inlet side of the valve casing 3, at the port 13ª leading into the pipe 12. Interposed between the two pipes 12 and 13, I prefer to employ another diaphragm-controlled valve, which is shown in detail in Fig. 2. The valve proper is indicated at 14, and controls the port 15, which connects the two pipes 12 and 13. This valve is also substantially balanced by connection with a small diaphragm 16, which is generally similar to the diaphragm 7. The upper end of the valve stem is connected to another diaphragm 18, which is generally similar to the diaphragm 8, and is weighted at 19. The port 17 of valve 14 communicates at its upper end at 20 with the space below the diaphragm 18.

21 is a casing in which the diaphragm 18 is mounted. Leading outwardly from the upper side of the diaphragm casing 21 is a pipe 22, which connects at 23 with an escape pipe 24, leading outwardly from the upper portion of the diaphragm chamber 10. A pipe 25 connects the pipes 22 and 24 with another diaphragm valve 26, which is in all respects similar to that shown in Fig. 2 and just described, except that the upper portion of its upper diaphragm chamber communicates with the atmosphere and has no connection corresponding to the pipe 22. The pipe 25 corresponds to the pipe 12, in its relation to this valve 26, the valve controlling a port which connects the pipe 25 with another pipe 27. The pipe 27 extends within a frame or casing 28, and has an escape port 29, which is controlled by a valve 30. One form of valve-controlling device is shown in Fig. 1, and on a larger scale in Fig. 4, and its actuating connections are shown in detail in Figs. 5, 6 and 7. This valve is mounted on a stem 31, which is connected by a crank arm 32 with a shaft 33, journaled in the supports 34 and 34ª, and carrying between said supports a pinion 35, fixed thereto. The teeth of this pinion mesh with the teeth of a sector 36. This sector is pivoted at 37 on a pin, which is carried by the support 34ª. This support 34ª is pivoted at its opposite end portion on the pin 39, carried by the support 34. The support 34ª has an upwardly projecting lug 40, in which is an oblong slot 41, through which passes a set screw 42, which seats in the support 34. The sector arm has an extension beyond its pivot, which is pivotally connected at 43 to the upper end of a bar or link 44. For the purpose of adjustment, this bar or link 44 is made in two sections adjustably connected by the screws 45, as best shown in Figs. 5 and 6. The lower end of the bar or link 44 is connected to the free end of a Bourdon tube 46, which opposite end is connected to a steam pipe 47, extending into the casing 28. In the present instance, the steam pipe 47 is connected with the steam space of the boiler to be regulated. It will readily be understood by those familiar with the art that I may use any well known thermostatic controlling device instead of the device shown in detail in Fig. 4.

The escape pipe, before referred to, is preferably provided with a suitable adjusting valve, by means of which the escape flow therethrough can be regulated. Fig. 3 shows in detail a simple and suitable form of valve for this purpose. It consists of a screw 48, seated in a plug 49, in the elbow portion 50 of the pipe 24. Cut in the end portion of this screw is a V-shaped slot or recess 51. This slot or recess is preferably V-shaped not only in the direction of the length of the screw, so as to be of decreasing cross section toward the head end of the screw, but is also V-shaped in cross section. Access to the head of this screw for purposes of adjustment is provided by means of the removable plug 52, seated in the elbow 50. The slot 51 forms the port through which the escaping gas must flow, and the effective area of this port can be accurately regulated by an adjustment of the screw.

The operation is as follows: The gas supply for the boiler flows through the pipe 2, in the direction indicated by the arrow, in Fig. 1. The valve 29 remains closed, so long as the steam pressure generated by the boiler does not exceed the desired maximum. When this maximum is reached, the expansion of the Bourdon tube acts upon the bar or link 44 to rock the sector 36 about its pivot. This turns the rock shaft 33, and through the crank arm 32 raises the valve 30 and opens the escape port controlled thereby. Prior to this time, the diaphragm valve 26 has been held in its closed position by the pressure below its diaphragm corresponding to the diaphragm 18 of Fig. 2. As soon as the valve 30 opens, the escape of pressure from below the diaphragm immediately causes valve 26 to open. This gives a free escape from the upper portion of the diaphragm chamber 10, controlled only by the throttling valve 48. The valve 14 has, up to this time, been held in its open position by the action of its diaphragm 18. As soon as pressure begins to escape from the upper side of the diaphragm 8 and also from the upper side of the diaphragm 18, the valve 14 closes, thereby cutting off the further flow of gas above the diaphragm 8. The valve 14 closes at this time, in opposition to the action of the weight 19, because the escape of gas from the upper side of the diaphragm 18 through the pipe 22 is unrestricted, while the escape from the upper side of the diaphragm 8 is restricted by the throttle valve 48. Therefore, the pressure at the upper side of diaphragm 18 is reduced more quickly than the pressure at its lower side and the latter preponderates. The closing of the valve 14 immediately checks the supply of gas to chamber 10, above the diaphragm 8, allowing the pressure below said diaphragm to preponderate and closing the valve 5 to an extent proportionate to such decrease in pressure.

The valve 5 will be held in its closed or partially closed position, so long as the escape valve 30 remains open. After the valve 14 has closed there is a gradual reduction of pressure below the diaphragm 18 due to the escape of the fluid through the port 17 into the diaphragm chamber 10 above the diaphragm 8. This escape continues until a point is reached when the weight 19 will predominate and act to again open valve 14 and permit a flow of the fluid from the pipe 12 into the upper portion of the chamber 10. When the pressure on the Bourdon tube decreases to such an extent as to close the valve 30, the valve 26 will immediately close by the building up of pressure below its diaphragm, and the valve 14 (if not already open) will open to again admit pressure at the upper side of the diaphragm 8, allowing the diaphragm 8 to descend, thereby opening valve 5.

By adjusting either the sections of the bar or link 44, or by adjusting the screw 42, so as to change the fulcrum point of the sector 36, the extent of opening of the valve 30 in any given movement of the tube 46 can be regulated. The stop 53 limits the opening movement of this valve 30.

The purpose of the diaphragm valve 26 is to render the device more sensitive. This valve is substantially a balanced valve, whereas the valve 30 is unbalanced. The provision of this valve 26, therefore, very considerably increases the sensitiveness of the apparatus. The provision of this valve 26 also prevents the valve 30 from being forced from its seat by the gas pressure acting against its under side. The valve 14 also has a similar function, being also substantially balanced. It therefore cuts off the flow of gas into the chamber above the diaphragm 8, immediately upon the opening of the valve 30. This enables the escape area of the port 51 in the valve 48 to be considerably reduced, without affecting the sensitiveness of the operation. I may, however, in some cases omit the valves 14 and 26, and in Fig. 8, I have shown an arrangement in which these valves are thus omitted. In this figure, the pipe 12$^a$, corresponding to the pipe 12, leads directly from the inlet end of the valve casing 3$^a$ into the diaphragm chamber 10$^a$, above the diaphragm 8$^a$, and the pipe 25$^a$ communicates directly with the escape port 29$^a$. I prefer, however, in this case to employ a substantially balanced double valve 30$^a$, instead of the single unbalanced valve 30, before described. In other respects, the construction, arrangement and operation are the same.

The advantages of my invention will be apparent, since it provides a very simple and sensitive form of regulator. The valve 5 being substantially balanced, responds immediately to changes in pressure above the diaphragm 8 or 8$^a$; and in the form of my invention first described, this reduction of pressure is instantly effected when the escape port 29 is open.

In place of the various diaphragms described, I may use any suitable form of pressure plate; and have used the term "pressure plate" herein and in the appended claims to include any suitable form of diaphragm or its equivalent.

Instead of the Bourdon tube pressure device for controlling the operation of the escape valve 30, I may employ any other suitable or well known form of controlling device capable of operating under changes of temperature or pressure.

By the term "heat controlled", used in the appended claims, with reference to this device, I intend to include both a thermostat and pressure devices in which the pressure is the result of heat.

I claim:

1. An automatic regulator of the character described, comprising the combination with a fluid pipe line and a valve acting to control the flow of fluid through said line, of a pressure plate carrying said valve, means whereby both sides of said plate may be exposed to the pressure of the fluid in the line controlled by said valve, there being an escape opening from one side of said pressure plate, a valve normally closing said escape opening, a heat-controlled device for controlling said escape valve, an automatic valve in the connection from the pressure line to that side of the pressure plate having the escape opening, said automatic valve having a pressure plate for balancing it, and there being an escape passage leading from one side of said pressure plate, substantially as described.

2. An automatic regulator of the character described, comprising the combination with a fluid pipe line and a valve acting to control the flow of fluid through said line, of a pressure plate carrying said valve, means whereby both sides of said plate may be exposed to the pressure of the fluid in the line controlled by said valve, there being an escape opening from one side of said pressure plate, a valve normally closing said escape opening, a heat-controlled device for controlling said escape valve, an automatic valve in the connection from the pressure line to that side of the pressure plate having the escape opening, said automatic valve having a pressure plate for balancing it, and there being an escape passage leading from one side of said pressure plate, together with an adjustable throttling device for the last-named escape valve, substantially as described.

3. An automatic regulator of the character described, comprising the combination with a fluid pipe line and a valve for controlling the flow of fluid through said line, of a balanced pressure plate connected to the stem of said valve, another pressure plate also connected to the stem of said valve, means for subjecting both sides of each pressure plate to the pressure of the fluid flowing through said line, an escape opening at one side of the second pressure plate, a heat device for automatically controlling said escape opening, and a throttling device for varying the flow to said escape opening, substantially as described.

4. An automatic regulator of the character described, comprising the combination with a fluid pipe line and a valve acting to control the flow of fluid through said line, of a pressure plate carrying said valve, means whereby both sides of said plate may be exposed to the pressure of the fluid in the line controlled by said valve, there being an escape opening from one side of said pressure plate, a valve normally closing said escape opening, a heat-controlled device which controls the said escape valve, together with an automatic valve in the connection in the pressure line to that side of the pressure plate having the escape opening, said automatic valve having pressure plates for balancing it, and an escape passage leading from one side of one of said pressure plates to the first mentioned escape opening, substantially as described.

5. An automatic regulator of the character described, comprising the combination with a fluid pipe line and a valve acting to control the flow of fluid through said line, of a pressure plate carrying the valve, means whereby both sides of said plate may be exposed to the pressure of the fluid in the line controlled by said valve, there being an escape opening from one side of said pressure plate, a valve normally closing said escape opening, and a heat-controlled device which controls the said escape valve, the operation of said heat-controlled device being dependent upon the pressure of fluid to be controlled, together with an adjustable valve for controlling the flow from the pressure chamber to said escape opening, substantially as described.

6. In apparatus of the character described, the combination of a pipe line, a valve for controlling the flow therethrough, a pressure plate for controlling the said valve, there being an escape passage leading from one side of the pressure plate, an automatically controlled valve for controlling said escape passage, means for effecting said automatic control, there being also a passage connecting the pipe line with the escape side of said pressure plate, a balanced valve controlling the last named passage, a pressure plate controlling the last named valve and having an escape passage connected with the first named escape passage, the last named pressure plate being normally exposed to line pressure on one side and to similar pressure on the other side by a connection with the escape side of the first named pressure plate, and means for causing a more rapid reduction of pressure when the escape valve is opened, at the escape side of the second named pressure plate than at the escape side of the first named pressure plate, substantially as described.

7. An automatic regulator of the character described, comprising the combination with a fluid pipe line and a balanced valve for controlling the flow from the said pipe line, of a pressure plate carrying said valve, means whereby both sides of said pressure plate may be exposed to the balanced pressure of the fluid in the line controlled by said valve, there being an escape conduit leading from one side of said pressure plate to an escape opening, a valve normally closing said escape opening, a thermostatic device which controls the said escape opening, and an automatic balanced valve in said conduit between the pressure chamber and the valve controlling said escape opening, substantially as described.

8. An automatic regulator of the character described, comprising the combination with a fluid pipe line, of a balanced valve for controlling the flow through said pipe line, a pressure plate carrying the valve, means whereby both sides of said plate may be exposed to the balancing pressure of the fluid in the line controlled by said valve, there being an escape conduit leading from one side of said pressure plate to an escape opening, a valve normally closing said escape opening, a thermostatic device which controls the said escape opening, and an automatic balanced valve in said conduit between the pressure chamber and the valve controlling said escape opening, substantially as described.

In testimony whereof, I have hereunto set my hand.

THOMAS B. WYLIE.

Witnesses:
 GEO. B. BLEMING,
 W. C. LYON.